US005953990A

United States Patent [19]
Chalmers et al.

[11] Patent Number: 5,953,990
[45] Date of Patent: Sep. 21, 1999

[54] COLOR PRINT STANDARDIZATION

[75] Inventors: Malcolm George Chalmers, St. Albans; John William Lewis Humphrey, Stafford; Stephen Thomas Lovatt, Surrey, all of United Kingdom; Andre Etienne Jean Laurent Marie Pagnac, Paris, France

[73] Assignee: Focoltone International Limited, Stafford, United Kingdom

[21] Appl. No.: 08/981,867

[22] PCT Filed: May 2, 1997

[86] PCT No.: PCT/GB97/01217

§ 371 Date: Feb. 4, 1998

§ 102(e) Date: Feb. 4, 1998

[87] PCT Pub. No.: WO97/42033

PCT Pub. Date: Nov. 13, 1997

[30] Foreign Application Priority Data

May 3, 1996 [GB] United Kingdom .................. 9609288

[51] Int. Cl.⁶ ...................................... B41M 3/00
[52] U.S. Cl. ........................................ 101/211; 101/483
[58] Field of Search ..................... 101/216, 365, 101/211, 483; 358/402, 401, 407, 408, 504; 356/394, 392, 393, 401

[56] References Cited

U.S. PATENT DOCUMENTS

| | | | |
|---|---|---|---|
| 4,310,248 | 1/1982 | Meredith | 356/402 |
| 4,492,474 | 1/1985 | Miller | 356/404 |
| 4,687,334 | 8/1987 | Miyakawa | 356/404 |
| 4,929,978 | 5/1990 | Kanamori | 355/38 |
| 5,063,583 | 11/1991 | Galkin | 378/207 |
| 5,598,272 | 1/1997 | Fisch et al. | 358/298 |
| 5,636,330 | 6/1997 | Barak | 395/109 |

*Primary Examiner*—J. Reed Fisher
*Attorney, Agent, or Firm*—Young & Thompson

[57] ABSTRACT

A master chart comprises a representation of various blocks (1) of color produced by suitable combinations of the base colors cyan, magenta, yellow and black (C,M,Y,K). There are also illustrations of color prints (2) which are to be printed by a copying machine onto a sheet. For the color standardization procedure test sheets are provided onto which the images from the master chart are to be printed. These carry the same array of color blocks (1A) and picture representations (2A) but the block and color representations are offset with respect to the positioning of the corresponding blocks on the master chart. The operator compares the various color blocks against one another and make an estimation as to what adjustments are needed to the copier to ensure that a more acceptable print is achieved.

7 Claims, 3 Drawing Sheets

COLOR PRINT STANDARDIZATION

BACKGROUND OF THE INVENTION

When colour printing is carried out by any form of print engine (including laser copiers, ink jet printers and dye transfer printers) there is no guarantee that the colour output will necessarily achieve the correct effect. Colour adjustment within the print engine may therefore be needed and an experienced operator can, after suitable trial and error, achieve an acceptable output. There is however no standard method for adjusting the colour output. Furthermore the input image might be in the form of a flat copy scanned by a copier or in the form of a digital file in a computerised print engine.

SUMMARY OF THE INVENTION

According to the invention there is provided a method of standardising colour printing using a print engine wherein a copy of a prepared master chart is printed onto or otherwise created relative to a prepared test sheet, with the master chart and test sheet carrying a series of equivalent colour patches in the same lay out but offset on the test sheet from the lay out on the master chart, the copied colour output of the colour patches, printed onto the test sheet, or otherwise produced from the master chart, is compared with the adjacent preprinted colour patches on the test sheet and the print engine is adjusted to correct any imbalance between the preprinted and copied colour patches.

The master chart may be in the form of a lithograph print or could be a digitally stored image in a computerised printing system which is then reproduced on a display screen. The test sheet could incorporate strategically positioned holes adjacent to each of the colour patches through which the colour patches, produced from the master chart onto a blank sheet or shown on the display screen can, be viewed for copy colour comparison.

The imbalance comparison between the reproduced colour patches from the master chart and the preprinted colour patches on the test sheet may be achieved visually or by suitable instrumentation. Correction of any imbalance can be made either by estimation or by instrumental calculation.

The colour patches could ideally be those created on a colour chart using the principles of Patent No. EP (UK) 0119836.

The master chart and the test sheet may additionally carry image registration symbols which will enable the user to determine image position adjustment to ensure correct registration of a printed image when normal printing commences.

BRIEF DESCRIPTION OF THE DRAWINGS

The invention may be performed in various ways and a preferred embodiment will now be described, by way of example, with reference to the accompanying drawings, in which.

DESCRIPTION OF THE PREFERRED EMBODIMENT

Figure 1:
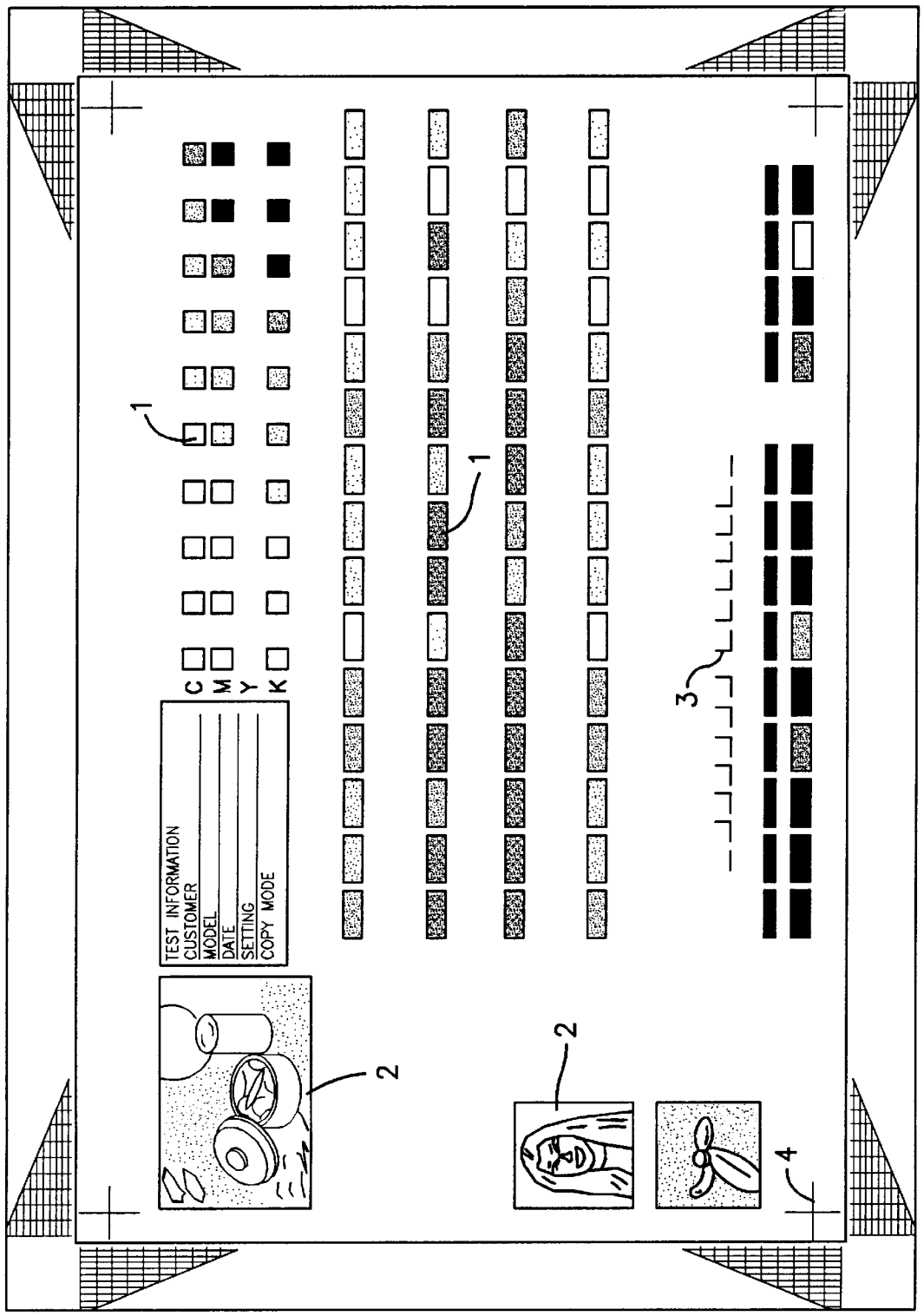
FIG. 1 is an illustration of a master chart for use in a colour printing standardisation system of this invention.
Figure 2:
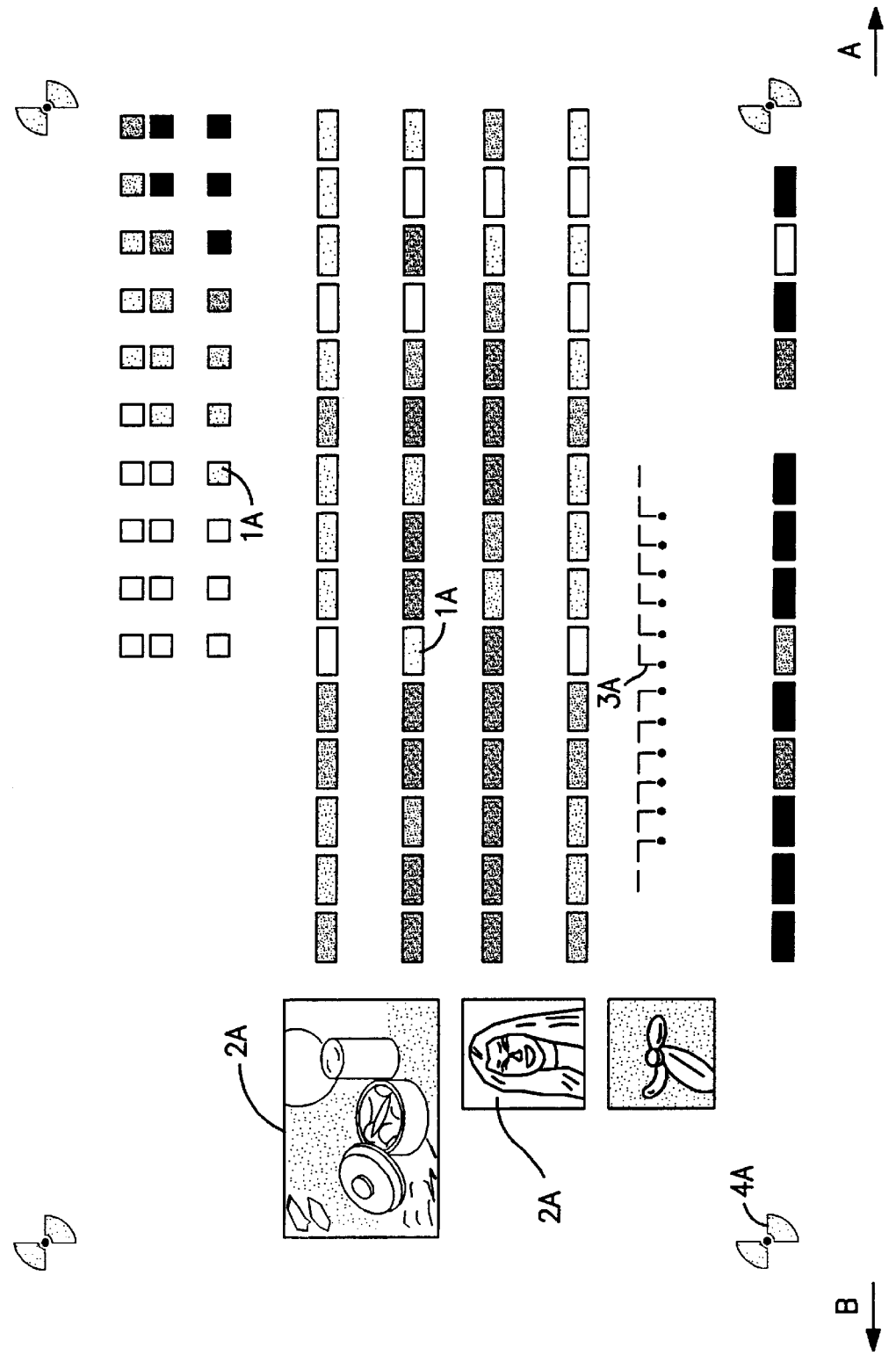
FIG. 2 is an illustration of a test sheet for use with the chart of FIG. 1.
Figure 3:
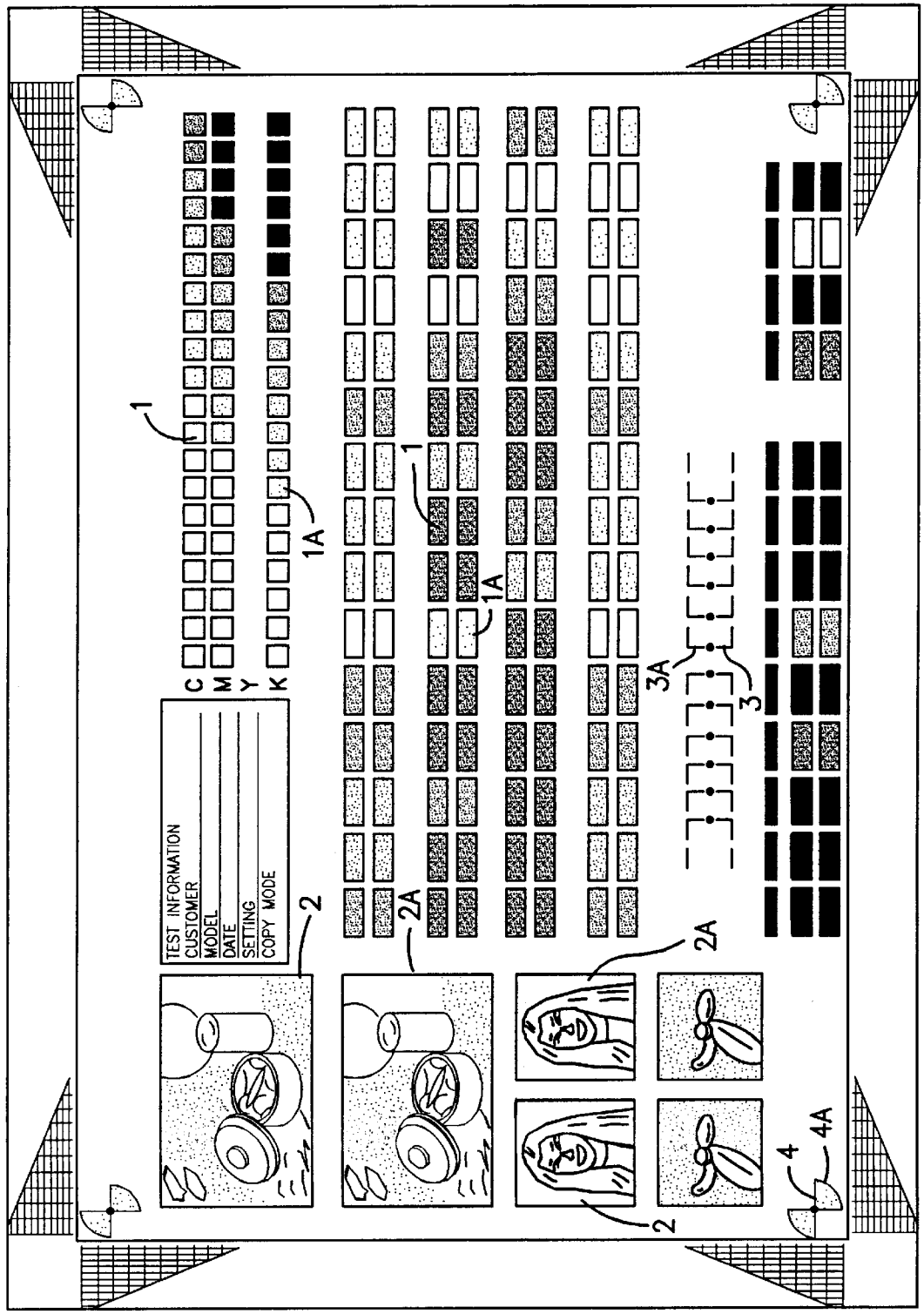
FIG. 3 is an illustration of a combination, by printing of the master chart of FIG. 1 onto the test sheet of FIG. 2.

The master chart shown in FIG. 1 comprises a representation of various blocks 1 of colour produced by suitable combinations of the base colours cyan, magenta, yellow and black (C,M,Y,K). There are also illustrations of colour prints 2 which are to be printed by a copying machine onto a sheet. For the colour standardisation procedure the sheets onto which the images will be printed are the test sheets shown in FIG. 2. These carry the same array of colour blocks 1A and picture representations 2A but the block and colour representations are offset with respect to the positioning of the corresponding blocks on the master chart of FIG. 1. When a print of the master chart is made onto the test sheet a representation as shown in FIG. 3 may be achieved. The operator can compare the various colour blocks against one another and make an estimation as to what adjustments are needed to the copier to ensure that a more acceptable print is achieved. The comparison and correction process can be carried out manually or automatically by suitable instruments. The process can then be repeated to determine whether the changes made are adequate.

It will be noted also that there are certain registration marks on the master chart and the test sheet. Firstly there are arrow indications 3 and 3A which should be aligned with one another when the copying takes place. Additionally the master chart has a cross-wire device 4 in each corner and the test sheet has a segment logo 4A in each corner. If these do not register satisfactorily with one another the operator can adjust the copier (or the positioning of the master sheet) to ensure closer registration onto the correct area of the sheet. This will automatically bring into line the adjacent blocks 1 and 1A.

To standardise the colour produced from digital files, the digital master chart is processed by a computer and used to drive the print engine, again producing an image alongside the pre-printed image. Comparison and adjustments are as before.

In the case of print engines requiring materials for making copies that cannot be pre-printed by lithography, a copy of the master chart, with holes through which to observe and/or measure the copied image can be used for the comparison and subsequent adjustments.

As the test sheet is printed by lithography to printing industry standards, the print engine is thus set to the same standards.

We claim:

1. A method of calibrating color printing in a printing engine, comprising the steps of:

providing a master sheet having a first array of desired colors thereon;

providing a test sheet having a second array of the desired colors thereon, the second array being offset from the first array so that when the first and second arrays are aligned, each of the desired colors of the first array is immediately adjacent to the same desired color of the second array;

printing an image of the master sheet on the test sheet using the printing engine;

comparing colors of the printed image of the master sheet's first array that appear on the test sheet with the corresponding desired colors of the test sheet's second array that are immediately adjacent thereto; and adjusting the printing engine responsive to the comparison.

2. The method of claim 1, wherein the master sheet and the test sheet are further provided with corresponding alignment features thereon so that when the corresponding alignment features of the master sheet and the test sheet are aligned, each of the desired colors of the first array is immediately adjacent to the same desired color of the second array.

3. The method of claim 1, wherein the step of comparing colors is performed visually.

4. The method of claim 1, wherein the step of adjusting the printing engine is performed manually.

5. The method of claim 1, wherein the step of comparing colors is performed automatically.

6. The method of claim 1, wherein the step of adjusting the printing engine is performed automatically.

7. The method of claim 1, wherein the step of printing the image of the master sheet on the test sheet includes the step of avoiding overlapping the image of the first array and the second array on the test sheet.

* * * * *